United States Patent [19]

Farmer et al.

[11] 4,252,519

[45] Feb. 24, 1981

[54] EXTRUSION DIE BLADE

[75] Inventors: Peter H. Farmer, Springfield, Mass.; Timothy J. Fowler, Des Peres, Mo.; John C. Hoagland, Longmeadow, Mass.

[73] Assignee: Monsanto Company, St. Louis, Mo.

[21] Appl. No.: 95,177

[22] Filed: Nov. 16, 1979

[51] Int. Cl.³ .............................................. B29F 3/04
[52] U.S. Cl. ................................ 425/466; 425/141; 425/143; 425/379 R
[58] Field of Search ............... 425/466, 461, 379, 141, 425/143, 378 R; 264/40.1, 40.6

[56] References Cited

U.S. PATENT DOCUMENTS

| | | | |
|---|---|---|---|
| 3,341,388 | 9/1967 | Bunyea | 264/40.6 |
| 3,767,346 | 10/1973 | Mihalik | 425/461 |
| 3,775,035 | 11/1973 | Scotto et al. | 425/144 |
| 3,819,775 | 6/1974 | Mules | 425/141 |
| 3,883,279 | 5/1975 | Heyer | 264/40.6 |
| 3,920,365 | 11/1975 | Mules | 425/141 |
| 3,940,221 | 2/1976 | Nissel | 425/141 |
| 3,941,551 | 3/1976 | Marion | 425/466 |

*Primary Examiner*—Jeffery R. Thurlow
*Attorney, Agent, or Firm*—David Bennett; William J. Farrington; Edward P. Grattan

[57] ABSTRACT

An improved slit die for extruding thermoplastic sheet and having the capacity for fine gauge control comprises a die blade and an opposed surface in which the local separation between the two is variable by the generation of localized expansion and contraction forces in the body of the die blade while isolating the die blade lip from temperature variations by the provision of a heat barrier means.

9 Claims, 3 Drawing Figures

EXTRUSION DIE BLADE

BACKGROUND OF THE INVENTION

This invention relates to die blades for use with extrusion dies of the type adapted to produce sheets of a thermoplastic polymer. It relates particularly to blades adapted for use in extrusion processes where it is important to maintain a careful control over the thickness of the extruded sheet.

The extrusion of a polymer between the lips of a sheet die gives a superficially uniform product but if the gauge is monitored, minor thickness variations are often found in the cross machine direction as well as in the direction of extrusion. These can be caused by uneven lip separation along the slit, differential temperatures within the polymer melt such that the amount of swell that occurs as the polymer exits the slit varies, or the presence of minor inhomogeneities in the melt.

It is often important to produce a polymer sheet of great gauge uniformity so that the resolution of this problem of gauge variation can be a very significant commercial goal.

DISCUSSION OF THE PRIOR ART

The earliest approach to gauge control was to provide that one of the die lips be moveable in response to the adjustment of a plurality of jack-bolts located along its length so as to control the separation between the opposed lips. This approach however leaves a substantial time lapse between the identification of the gauge variation problem and its correction. Moreover, the adjustment is a matter of trial and error and needs much experience on the machine with specific polymers before it can be done with any degree of efficiency.

One solution to this control problem is to control the temperature of the die lip along its length so as to provide that perceived thickness variations can be corrected by increasing or decreasing the die lip temperature, and hence that of the polymer melt in contact therewith, in the region of the thickness variations. This approach is exemplified in U.S. Pat. No. 3,819,775.

An alternative, mechanical approach is to provide that at least one of the lips is flexible to the extent it can be locally deformed by physical pressure to provide local adjustment of the die gap. This approach was shown in U.S. Pat. No. 2,938,231 in which the jack bolts conventionally used to adjust the die gap thickness were elongated and provided with heater mechanisms such that activation of the heater mechanism associated with a bolt caused the bolt to expand and locally deform the flexible lip thus narrowing the slit at that point.

This approach was refined in U.S. Pat. No. 3,940,221 which added to the earlier device a cooling means associated with each bolt so as to permit adjustment by contraction as well as expansion of the bolt and therefore a more rapid response to the need for adjustment. One specific problem encountered with such gauge control devices is that of "stick-slipping", that is the tendency to resist the expansion forces and then, when a resistance threshold has been overcome, moving suddenly by an amount that may well be excessive if only fine adjustment is needed. This problem is a serious limitation on the utility of such devices.

All the above systems can be linked by computer-based systems to a downstream gauge monitoring device so as to bring about an automatic, corrective actuation of the heating means to correct any perceived gauge variation. This means that the gauge control can be completely automated in a highly efficient manner.

However, such techniques have the disadvantage that the spacing of the adjustment points is limited by the dimensions of the bolt and its associated heating and cooling means. Additionally the stick-slipping problem described above places limitations on the speed by which the device can respond accurately to a need for adjustment.

DESCRIPTION OF THE INVENTION

A new die blade has now been designed for use in the extrusion of thermoplastic polymer sheets of very closely controlled gauge. A die incorporating the die blade of the invention is capable of responding rapidly to any perceived gauge variations in such a way as to eliminate them. The die blade of the invention does not require the somewhat bulky expandable bolts that in some cases render it impossible to have the adjustment points as close together as would otherwise be desired.

The adjustment technique is usually at least as responsive to the alternatives and is capable of application to existing extrusion apparatus with little in the way of structural modification.

A slit die incorporating the die blade of the invention is one in which local adjustment of the die gap is achieved by providing means for generating expansion and contraction forces in the body of the die blade while providing heat barrier means to minimize the effect of temperature variations on the temperature of the die blade lip.

This can be done by providing a plurality of temperature adjustment means disposed within the body of the blade in aligned, spaced relationship along its length and, disposed between the temperature adjustment means and the die blade lip, a heat barrier means adapted to maintain the die blade lip at a constant temperature.

The function of the temperature adjustment means is to generate local heating or cooling in the die blade so as to produce local expansion or contraction tending to deform the die blade lip. This tendency is reinforced by the fact that the blade is usually bolted to the die block adjacent the edge opposed to the lip, thus limiting expansion in that direction.

The provision of the heat barrier means ensures that the temperature variations generated by operation of the temperature adjustment means do not affect the temperature of the blade in the area in which it is in contact with the extruding polymer.

The temperature adjustment means can be located in the body of the die blade as shown in FIGS. 1 and 2 and can operate upon any suitable basis such as for example the use of a circulating fluid or by the use of electrical heating or a combination of any such means. One embodiment of such an adjustment means is a passage formed in the body of the die blade through which a heated fluid can be circulated. By adjusting the temperature of the fluid, perhaps by a mixing technique or by actuation of appropriate heating and cooling means, the temperature of the block in the immediate vicinity of the means can readily be adjusted. Another alternative is to provide that the temperature adjustment means be provided by an electrical heater device that may, if desired, be associated with a passage through which a cooling fluid can be circulated to accelerate cooling of the adjacent portion of the block when the current is removed from the heater.

It is often preferred that adjacent temperature adjustment means be insulated from one another to avoid the tendency to dissipate the expansive forces over too large an area, thus introducing a blade deformation over too great a proportion of the length of the blade. This is usually done by providing that between each pair of adjacent heater elements there be an air space adequate to provide some degree of thermal isolation of the heated portions from one another. These may conveniently take the form of slots through a portion or all of the thickness of the die blade.

In one embodiment of the invention, (illustrated in FIG. 3), the temperature adjustment means is provided by a plurality of individual blocks provided with the necessary heating and if desired cooling means.

The blade is provided with elongated apertures at right angles to the block lip to receive the blocks and leave an insulating air gap around each. Thus when the block is bolted to the blade, only the top and bottom are rigidly restrained and the expansion and contraction of the block will produce substantially localized deformations of the adjacent portion of the die blade lip.

In some circumstances it is advantageous to provide that the blocks have larger coefficients of expansion than the material of the die blade so as to enhance the effect of relatively minor temperature variations. For this reason brass or aluminum blocks are often preferred.

In each die blade there is a neutral bending axis defining the line along which the metal is neither compressed nor stretched when the blade is flexed. Expansion forces acting mainly above this line will tend to produce deformations between points at which the blade is anchored. Forces acting mainly below the line are better capable of generating local deformations. It is therefore a preferred feature that the heaters be located at least predominantly below the neutral bending axis, that is to say predominantly between the axis and the die blade lip. Moreover location of a further set of heaters similar to the heaters used in the device of the invention but located above the neutral bending axis can be used to generate coarse adjustments of the blade gap of the type that might otherwise be handled by adjustment of jackbolts.

In all embodiments of the invention the portion of the die blade in contact with the resin is insulated from the temperature fluctuations in the temperature adjustment means by the provision of a heat barrier means disposed in the body of the blade between the temperature adjustment means and the die blade lip. This heat barrier means can be an insulation layer but in practice this would often tend to absorb the expansion forces designed to deform the blade. It is very much preferred therefore that the heat barrier means comprise a passage running the length of the die blade and adapted to circulate a heat transfer liquid at a constant temperature. This circulating liquid then absorbs the temperature variations generated by the temperature adjustment means and prevents them from affecting the melt temperature as it exits the die.

The die can comprise two such die blades but more commonly only one is required, the opposed surface defining the die orifice being fixed with respect to the adjustable blade.

To make most effective use of the great responsiveness of the die of the invention, it is desirable that the temperature adjustment means are connected up by computer relays to a gauge sensing means and are adapted immediately to produce an appropriate change in the temperature of the portion of the blade corresponding to the position at which a gauge variation has been identified.

DESCRIPTION OF THE PREFERRED EMBODIMENTS

The invention is now further described in relation to the attached drawings which are for the purpose of illustration only and are not intended to imply any limitation on the essential scope of the invention.

Figure 1:
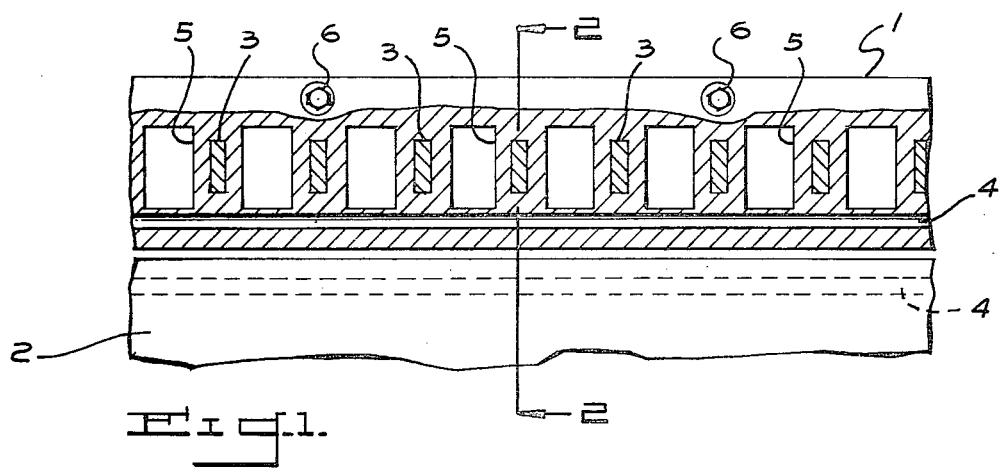
FIG. 1 shows a partial plan view of a die blade of the invention.
Figure 2:
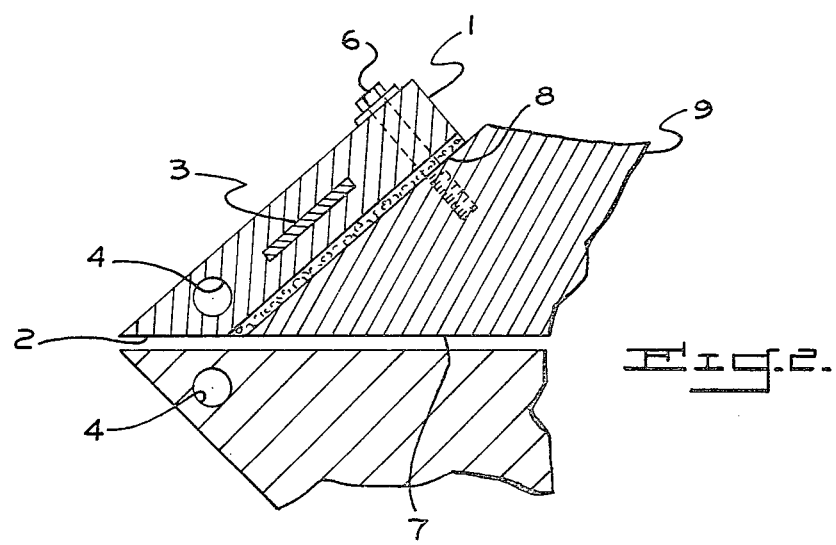
FIG. 2 shows a cross-section along the line 2—2 of the die blade illustrated in FIG. 1 in place of an extrusion slit die. The die is shown in diagrammatic cross-section.

Referring to the embodiment described in FIGS. 1 and 2, the die blade, 1, comprises a chiselled lip portion, 2, that in use is the portion contacting the extruding polymer. The body of the blade is provided with a plurality of temperature adjustment means in the form of heater elements, 3. These heater elements are present in spaced alignment along the length of the blade. The die blade is provided with slots, 5, between each pair of heater elements to provide some degree of insulation. The die blade is secured to the die block, 9, by bolts, 6.

Between the row of heater elements and the lip of the die blade is a heat barrier means in the form of a passage, 4, running substantially the length of the blade and adapted to carry a heat transfer liquid and act as a heat sink to prevent any temperature fluctuation in the body of the blade from significantly affecting the temperature of the die blade lip.

The die blade of the invention is preferably provided with a layer of insulating material, 8, between it and the die block, 9, to which it is bolted. An alternative expedient is to hollow out a portion of the blade bolted to the die block such that the area in contact therewith is minimized.

Figure 3:
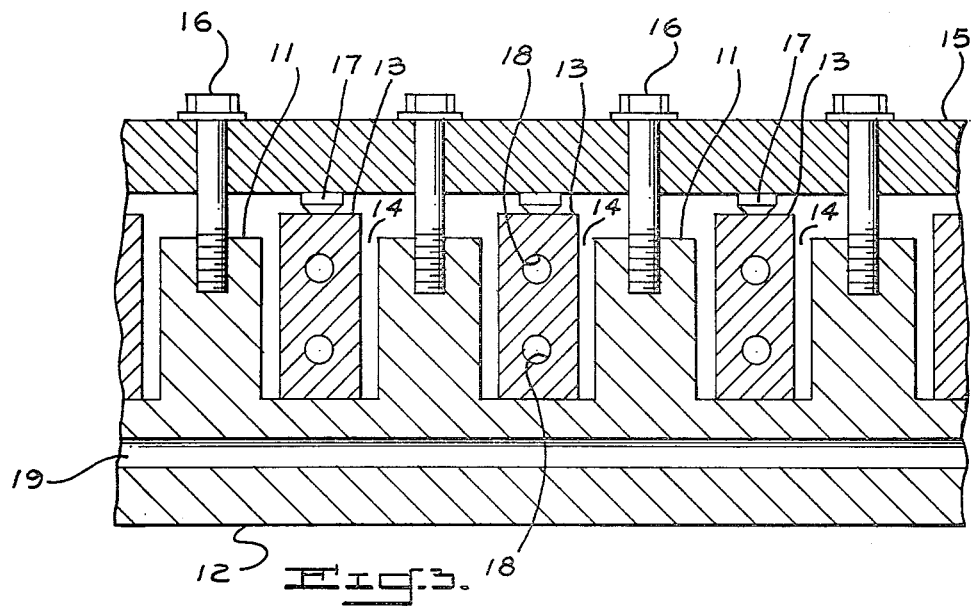
FIG. 3 shows a partial longitudinal cross-section of an alternative die blade of the invention.

In FIG. 3 which shows alternative embodiment of the invention the die blade, 11, has a die lip, 12, and, located in the slits, 14, in the body of the blade and oriented at right angles to the lip, a plurality of heater blocks, 13, of such dimensions that the block does not contact the sides of the slot. Each block bears against support studs, 17, affixed to an inelastic support, 15. The die blade is secured to the inelastic support by a plurality of bolts, 16. Each heater block is provided with heater elements, 18. A heat barrier between the die lip and the heater blocks is provided by the bore, 19, which is adapted to circulate a heat transfer fluid at a constant temperature.

In use and referring specifically to FIGS. 1 and 2, a thermoplastic resin is extruded through the channel, 7, and through the slit die provided by the lip, 2, of the die blade of the invention and an opposed stationary lip. The heater elements are heated to maintain the block at a constant temperature until a gauge variation is detected in the extruded sheet.

When this happens the current in the heater adjacent the point at which the gauge variation occurred is increased or reduced until the expansion or contraction forces so generated have adjusted the die gap in such a way as to eliminate the gauge variation.

The alternative embodiment illustrated in FIG. 3 functions in an essentially similar fashion.

The description provided above with reference to the drawings should not be taken as implying any limitation on the essential scope of the invention which is understood to embrace a plurality of minor variations and modifications that do not depart from the spirit of the invention.

What is claimed is:

1. In a slit die defined by a die blade lip and an opposed surface in which local fine adjustment of the die gap is achieved by expansion and contraction forces tending to produce local deformations in the die lip, the improvement which comprises providing means for generating the expansion and contraction forces in the body of the die blade while providing a heat barrier means located within the body of the die blade between the expansion and contraction force generating means and the die lip so as to minimize the effect of temperature variations on the temperature of the die blade lip.

2. In a slit die defined by a die blade lip and an opposed surface in which local fine adjustment of the die gap is achieved by expansion and contraction forces tending to produce local deformations in the die lip the improvement which comprises providing in the body of the die blade, in aligned, spaced relationship along its length, a plurality of die blade temperature adjustment means and, disposed between the die blade temperature adjustment means and the die blade lip, a heat barrier means adapted to minimize the effect on the die blade lip temperature of the operation of the die blade temperature adjustment means.

3. A slit die according to claim 2 in which adjacent die blade temperature adjustment means are thermally isolated one from another.

4. A slit die according to claim 3 in which the thermal isolation is achieved by the provision of an air-space in the die blade between adjacent temperature adjustment means.

5. A slit die according to claim 2 in which the die blade temperature adjustment means are located at least predominantly below the neutral bending axis of the die blade.

6. A slit die according to claim 5 in which the die blade is provided with coarse die lip adjustment means comprising a second row of die blade temperature adjustment means located above the neutral bending axis of the die blade.

7. A slit die according to any of claims 1 to 6 in which the die blade heat barrier means is provided by a heat transfer fluid circulation means located in the portion of the die blade between the die blade lip and the aligned die blade temperature adjustment means.

8. A slit die according to any of claims 1 to 6 in which the die blade temperature adjustment means comprises means for both heating and cooling the portions of die blade in contact therewith.

9. In a slit die defined by a die blade lip and an opposed surface in which local fine adjustment of the die gap is achieved by expansion and contraction forces tending to produce local deformations in the die lip, the improvement which comprises providing, in the body of the die blade, a plurality of temperature adjustment means, said means being in an array located at least predominantly below the neutral bending axis of the die blade, aligned parallel to the die blade lip, thermally isolated from one another by an interposed air-space, and thermally isolated from the die lip by the provision of a heat transfer fluid circulation means located in the portion of the die blade between the die blade lip and the aligned die blade temperature adjustment means.

* * * * *